July 3, 1945.   G. C. MORRIS   2,379,645
WELDING TOOL
Filed Nov. 17, 1943   2 Sheets-Sheet 2
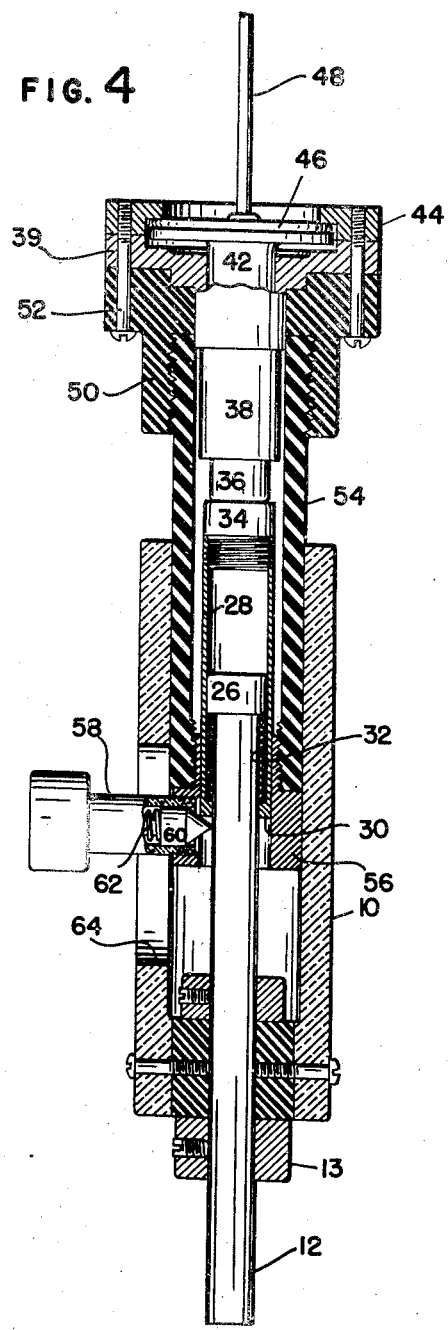
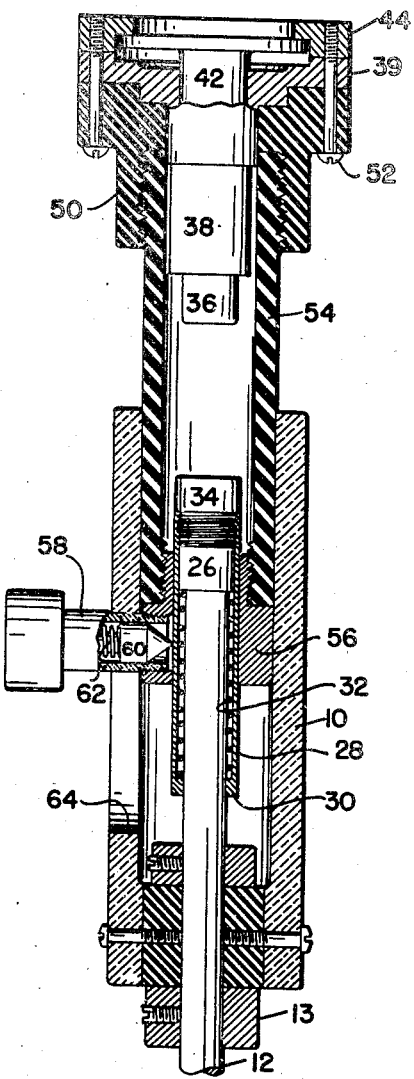
GEORGE C. MORRIS INVENTOR
BY
Smith & Tuck
ATTORNEY Patented July 3, 1945

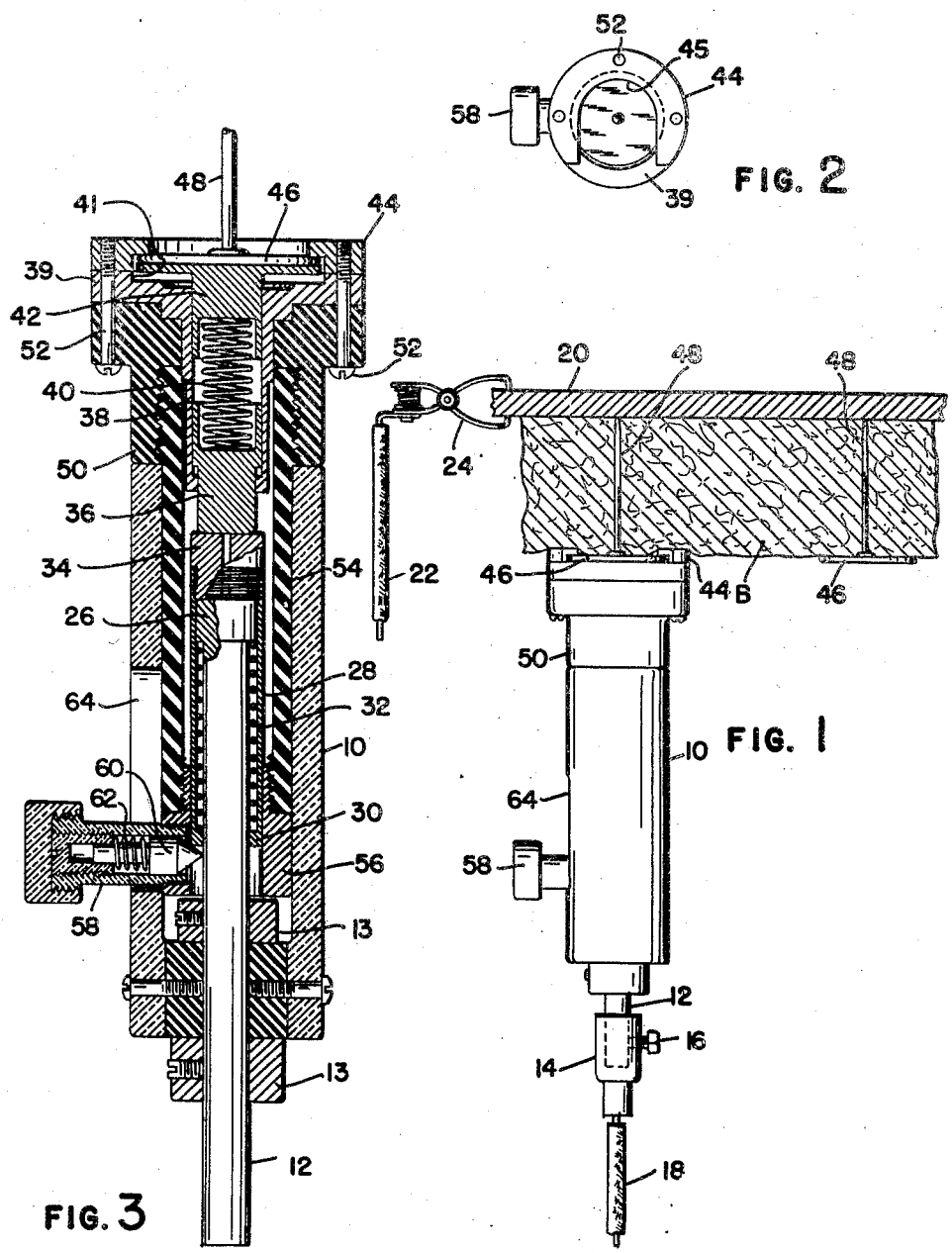

2,379,645

UNITED STATES PATENT OFFICE 2,379,645

WELDING TOOL

George C. Morris, Seattle, Wash.

Application November 17, 1943, Serial No. 510,627

4 Claims. (Cl. 219—4)

This invention relates to a welding tool useful in holding for welding small buttons or tacks and, more particularly, is the provision of a manually operable electric welding tool having tack holding means as well as circuit breaking means.

In the construction of steel structures such as ships and the like it has been found highly expedient to apply to certain surfaces insulative batts formed, for example, of spun glass or rock wool. These batts are customarily furnished in sheets about two inches thick and of varying overall sizes. They are applied directly to the various faces of the metal structures and have in the past been secured in place by bolts, tie wires and other similar contrivances which require extensive planning and preparation by the placement of the fastener means prior to the actual placing of the batts. Such work is slow and tedious and requires great skill in order that the pre-placed fastener elements will be accurately located. More recently it has become customary to employ nails or tacks that have fairly large heads and whose shanks are welded in place after they have been inserted through the batt material and contact is effected with the base metal to which they are secured. Various attempts have been made to perform such welding jobs by using the usual welder's "stinger" but that is unsatisfactory as, unless the current is broken at the welding machine or otherwise, an arcing occurs on the head of the tack as it is disengaged and it is thereby disfigured if not wholly destroyed. Further, this practice is unsatisfactory since too often a poor contact is made between the stinger and the head of the member being placed and arcing occurs during welding as well as later.

It is, therefore, an important object of this invention to provide a welding tool adapted to hold insulation securing tacks which can be easily engaged upon as well as off the tack without exposing the operator to the current flow and without arcing at the points of contact between the holder and the tack.

Another object of this invention is the provision, in a welding tool of the type described, of circuit making and breaking means whereby the circuit to the tack may be severed after welding and the tool disengaged without injury to the tack.

Still another object of the invention resides in the provision, in a welding tool, of circuit making and breaking means that will last through a long and useful life and will function to break a heavy current flow without undue deterioration of the contact faces and parts.

The foregoing objects and others ancillary thereto I prefer to accomplish as follows:

According to a preferred form of my invention, I dispose within an insulative casing a circuit making and breaking mechanism and, upon the casing, workpiece holding means. Specifically the casing is a handle that supports a conduit bar slidably associated with a spring pressed contactor. Extending from the contactor to outside the casing is an actuator knob enclosing a spring pressed detent that presses upon the slidable contactor on occasion so that when the conductor bar and the casing handle are moved relative thereto power is stored in the resilient means pressing the contactor until a sufficient amount is created and the contactor is rapidly withdrawn from a button that conducts the current to the workpiece holder upon the outer casing. The work holder is adapted to slidably receive the head of a tack to be welded in place and to similarly be freed from the tack after the circuit is broken. The circuit breaking means functions to rapidly break the flow across the contactor and the button to insure long life in these parts. The holder is designed to firmly grip the tack over a large area to insure good contact as well as a firm physical hold thereupon.

The novel features that I consider characteristic of my invention are set forth with particularity in the appended claims. The invention itself, however, both as to its organization and its mode of operation, together with additional objects and advantages thereof, will best be understood from the following description of a specific embodiment when read in connection with the accompanying drawings, in which Figure 1 is a view in elevation of my welding tool, Figure 2 is a plan view of the work holding end of the tool, and Figures 3, 4 and 5 are longitudinal sectional views, slightly enlarged, of the tool in various sequential positions during the operation of releasing the tool from the workpiece.

A welding tool to overcome the defects hereinbefore enumerated must have at least two totally distinct characteristics; it must be capable of firmly holding and conducting current to a workpiece to be welded; and it must also provide circuit breaking means that have a long life and will function efficiently as well as rapidly with a minimum of wear during use. Accordingly, a preferred embodiment of my invention, referring to the figures of the drawings, throughout which like reference characters designate like parts, is constituted by a handle casing 10 having a male conductor bar 12 rigidly associated therewith by means of collars 13, 13, and extending from one end for engagement within a female coupler 14 that is retained in place by the set screw 16 and which receives electrical energy from the flexible conductor wire 18. Wire 18 forms one side, normally called the "hot" side, of a circuit which is grounded to the metal structure 20 to be worked upon by means of the wire 22 and clip 24. It will be understood that, between the ends of wires 18 and 22 there is employed a conventional welding generator (not shown) to produce the proper current characteristics for the conduct of the welding operation.

Bar 12 has an enlarged head 26 and is enclosed in the tubular contactor member 28 which has a lower end that is reduced by bushing 30 to the size of bar 12. Between the head 26 and bushing 30 is an expansion spring 32. In the upper end of tube 28 is threaded the contactor head 34 which, when the circuit is closed, presses against the resiliently pressed button 36 that is slidably mounted in a metallic casing 38 that encloses the spring 40 and which, in the other or upper end, mounts for sliding movement the flanged contactor member 42. Casing 38 is flanged at 39 and countersunk at 41 to provide a seat for the flange of contactor 42. A U-shaped retainer member 44 having a lip 45 overhanging the flange of contactor 42 is superimposed upon the latter which, being pressed by spring 40, grips therebetween the head 46 of the tack that includes shank 48.

Surrounding the upper end of tube 38 and flanged in like manner is member 50 formed of insulation material. Bolts 52 pass through the flanges of members 50, 39 and 44 to secure the same together in a rigid manner.

Depending from member 50 is the insulation tube 54 that has a lower bushing 56 from one side of which stands the knobbed tube 58. Interior of tube 58 is located the pointed detent 60 that is pressed toward the axis of the tool by spring 62 to rest upon the bar 12. The casing 10 has a slot 64 to permit relative movement between tube 58 and casing 10 at such times as a circuit is being made or broken.

A welding operation carried on with the use of this tool is as follows: the tack is placed in the holder as appears in Fig. 3 with the head 46 gripped between members 42 and 45. The circuit through contactor head 34 and button 36 may be closed or open as desired during insertion of the tack head into its holder. With the circuit closed and the base metal 20 grounded the shank 48 of the tack is inserted through the insulative batt B until contact is made with the base metal whereupon an arc is struck. It is usual for the operator to withdraw the tack point a slight distance from the base 20 to define a desired arc and to produce the proper heat for fusion of the metals. This occurs in just a moment and the tool and tack is then shoved slightly inward toward the base whereupon the metals fuse and the weld is completed. If the tack head were removed from the clip holder of the tool an arc would be made between the two and the tack head would be marred and otherwise made unsightly. It is preferable that the circuit be broken and, to do so, I accomplish this by withdrawing the head 34 from button 36.

A downward pull is exerted upon casing 10 against the anchored tack to withdraw the casing from the member 50 at the parting line therebetween as shown in Fig. 4. Downward movement of the casing carries with it the bar 12 whose enlarged head 26 presses upon and compresses the spring 32, it being understood that the sleeve 28 is restrained from following this movement by the detent 60. At such time as the pressure downward upon the detent is sufficient to overcome the spring therebehind as well as friction between the end 30 of the tube and the cam face of the detent, the latter retracts and the power stored in spring 32 separates the members 34 and 36 with a rapid snap action to produce the condition shown in Figure 5 in which case the circuit is broken with the minimum of arcing and contact face deterioration.

As stated above another tack may be placed in the holder while the electrical circuit is broken as is the case in Fig. 5 or it may be placed there later when the circuit is reestablished. In either case no harm is done as long as the point of the tack is out of contact with the ground side of the circuit.

To remake the circuit through the tool, the operator merely shoves the casing 10 toward the head and its holder in which case the parts reassume the relative positions shown in Fig. 3.

It will be recognized that all the parts of my device are capable of being formed in a rugged manner to insure long life of the parts under the usual hard usage given such equipment. At the same time all parts near the handle are insulated for maximum protection of the operator from electrical burns.

Thus having described my invention, I claim:

1. A welding tool for pins having heads, comprising: a tubular handle having a conductor bar anchored therein to be coupled with a welding lead, the inner end of said bar having an enlarged head, a non-conductive sleeve slidable in said handle surrounding said bar inner end and including electro-conductive means for gripping such a pin by its head, a conductor sleeve telescopically mounted on said bar in contact with said gripping means, spring means between the enlarged head of said bar and said conductor sleeve to normally maintain the sleeve telescoped with respect to said bar, and a spring pressed detent between said conductor sleeve and said non-conductive sleeve operable upon movement of said handle relative to said non-conductive sleeve to restrain said conductor sleeve and store energy in said spring until said stored energy overcomes the restraining action of the detent whereupon the conductor sleeve is rapidly withdrawn from contact with the gripping means.

2. A welding tool for pins, comprising: a tubular handle having a conductor bar anchored therein to be coupled with a welding lead; a non-conductive sleeve slidable in said handle, surrounding said bar inner end, and including electro-conductive pin-contacting means for contacting such a pin; a conductor sleeve telescopically mounted on said bar in contact with said pin-contacting means, spring means between said bar and said conductor sleeve to normally maintain the sleeve telescoped with respect to said bar, and a spring pressed detent between said conductor sleeve and said non-conductive sleeve operable upon movement of said handle away from said non-conductive sleeve to restrain said conductor sleeve and store energy in said spring until said stored energy overcomes the restraining action of the detent, whereupon the conductor sleeve is rapidly withdrawn from the pin-contacting means.

3. A welding tool for pins, comprising: an insulative tubular first handle having therein a telescopic two-part conductor means and spring means for normally holding said two parts in telescoped position, a non-conductive second handle sleeve slidable with respect to said first handle and including electro-conductive means for contacting such a pin and said two-part conductor means to form part of an electrical circuit, and a spring pressed detent carried by said second handle sleeve for holding one portion of said two-part conductor means in contact with said pin-contacting means, said detent being operable upon movement of said handles away from each other to restrain one part of said conductor means and to store energy in said spring means until said stored energy overcomes the restraining action of said detent, whereupon the restrained part is rapidly telescoped with respect to the other part of the two-part conductor means to open the electrical circuit.

4. A welding tool for pins, comprising: an insulative tubular first handle and a non-conductive second handle sleeve slidable with respect to said first handle; said handles having therein a telescopic two-part conductor means, a switch contact secured to said conductor means, spring means for normally holding said two parts in telescoped position, and electro-conductive means for contacting such a pin and said two-part conductor means, said two-part conductor, contact and electro-conductive means forming part of an interruptable electrical circuit suitable for welding such a pin to another piece of metal; and a spring pressed detent carried by one of said handles for holding one portion of said two-part conductor means in closed circuit position; said detent being operable upon movement of said handles relative to each other to restrain one part of said conductor means and to store energy in said spring means until said stored energy overcomes the restraining action of said detent, whereupon the two parts of said conductor means are telescoped and said contact is rapidly moved to open the electrical circuit.

GEORGE C. MORRIS.